United States Patent [19]
Lieber et al.

[11] Patent Number: 5,220,164
[45] Date of Patent: Jun. 15, 1993

[54] INTEGRATED IMAGING AND RANGING LIDAR RECEIVER WITH RANGING INFORMATION PICKOFF CIRCUIT

[75] Inventors: Albert J. Lieber, Del Mar; Peter K. Trost, Carlsbad, both of Calif.

[73] Assignee: General Atomics, San Diego, Calif.

[21] Appl. No.: 876,966

[22] Filed: Apr. 30, 1992

Related U.S. Application Data

[63] Continuation-in-part of Ser. No. 831,403.

[51] Int. Cl.[5] .............................................. H01J 31/50
[52] U.S. Cl. .................................. 250/214 VT; 356/5
[58] Field of Search ................ 250/560, 561, 213 VT; 356/5; 313/529, 537; 358/107

[56] References Cited

U.S. PATENT DOCUMENTS

5,049,730 9/1991 Loveland ..................... 250/213 VT

Primary Examiner—David C. Nelms
Attorney, Agent, or Firm—Fitch, Even, Tabin & Flannery

[57] ABSTRACT

An integrated LIDAR receiver includes a single detection element to provide both imaging and ranging functions. The single detection element includes an opaque photocathode, a microchannel plate (MCP) electron multiplier, and a phosphor coated anode covered with a metalized layer. The metalized layer on the phosphor anode allows electrons striking the anode to be detected as a prompt electrical current. The prompt electrical current is detected through a transformer that couples the anode to a power supply. The power supply biases the anode relative to the MCP and photocathode such that the MCP is grounded. The use of a transformer allows the prompt anode current to be detected without having to ground the anode, thereby simplifying the power supply circuitry. The detection of the prompt electrical current provides a first output signal useful for ranging information. Visible light (photons) is also output from the anode in response to electrons striking the phosphor in the anode, and is used to provide an intensified image of a scene. The visible light may thereafter be detected by an imaging sensor, such as a CCD camera.

22 Claims, 5 Drawing Sheets

INTEGRATED IMAGING AND RANGING LIDAR RECEIVER WITH RANGING INFORMATION PICKOFF CIRCUIT

This application is a continuation-in-part of U.S. patent application Ser. No. 07/831,403, filed Feb. 5, 1992.

BACKGROUND OF THE INVENTION

The present invention relates to light imaging detection and ranging (LIDAR) systems, and more particularly to an integrated LIDAR receiver that provides both imaging and ranging information, and wherein the ranging information is obtained using a pickoff circuit that does not interfere with the optimum biasing of the LIDAR receiver.

In a LIDAR system, a pulsed light source (such as a pulsed laser) emits a brief intense illuminating pulse of light at a known time, e.g., when triggered by a timing circuit. The pulse of light is directed at a target area where a specific target, such as a rocket, is to be monitored. The emitted light pulse propagates at the speed of light (for the relevant medium through which it is traveling), and thus arrives at the target some finite time after its known transmission time. Upon striking the target, a portion of the energy associated with the incident light pulse is reflected from the target. The reflected light pulse also propagates at the applicable speed of light back to a receiver location, where an appropriate receiver is positioned to receive the reflected light energy. Thus, the light travels the same path going to the target as it does returning therefrom, and the propagation time is the same in both directions. Advantageously, the returned light pulse includes both ranging information (i.e., the round trip propagation time of the emitted light pulse) and imaging information (i.e., whatever image information is recoverable from the returned light pulse) for the target. Thus, through the use of appropriate processing circuits within the receiver, coupled to the same timing circuit used to trigger the light pulse, it is possible to extract both the ranging and imaging information from the returned light pulse.

If a perfect light detector were available, the extraction of the desired ranging and imaging information from the returned light pulse would be straightforward. That is, all that would be required would be to position such "perfect light detector" to detect the received light pulse, note the precise time at which the returned light pulse was received relative to when the light pulse was transmitted in order to determine the ranging information, and to process the detected light signal in order to provide the desired imaging information.

Unfortunately, perfect light detectors do not exist. All known light detectors use an appropriate conversion process to convert the incident photon energy to an appropriate output signal, usually an electrical signal, and/or to an amplified photon signal. That is, light detectors utilize a conversion process that converts incident photons (contained in the incident light signal) to electrons (contained in an electrical output signal). Further, an amplified (or intensified) photon signal is generally obtained only after first converting the photons to electrons, amplifying the electrons, and converting the amplified electrons back to photons.

Disadvantageously, conflicting requirements exist relative to the type of photon conversion process needed to provide the best ranging information and the best imaging information. For ranging, it is best to have a very sharp return pulse, indicative of the precise time a packet of photons is received at the light detector. Such sharp return pulse thus advantageously provides a precise indication of when the return pulse was received, and thus provides (when compared to the trigger time of when the initial pulse was transmitted) a very accurate indication of the round trip signal propagation time, and hence an accurate indication of the location of the target relative to the LIDAR transmitter/receiver location.

In order to detect such a sharp return pulse, useful for ranging purposes, a wide bandwidth is required. Unfortunately, imaging detectors do not have a sufficiently wide bandwidth for this function. That is, by the time the photons have been received and processed so as to provide an image signal in imaging detectors of the prior art, too much time has elapsed for the signal to be an accurate indicator of the photon receipt time.

In order to address the above conflicting photon detection requirements, it is known in the art to use a LIDAR receiver that has two different detectors, one for ranging and one for imaging. For such dual-detector LIDAR receiver to function, it is necessary to split the return light pulse (or return "beam"). One part of the split beam is directed to a first detector, typically an avalanche photodiode, used to measure the time-of-flight for range determination. The other part of the split beam is directed to a gated image intensifier (amplifier), which intensifies (amplifies) the returned image. The intensified image is then directed to an imaging device, typically a charge-coupled device (CCD) camera, whereat it is digitized for image processing.

The dual-detector LIDAR receiver requires two optical paths. Disadvantageously, the return beam power must be split or divided between the two paths, thereby reducing the available power in each path. Reduced power, in turn, lowers the overall range over which the LIDAR receiver may be used. What is needed, therefore, is a LIDAR receiver having increased range capabilities.

The use of two optical paths also requires the use of several optical components, e.g., a beamsplitter, optical filters and focusing optics, in each optical path. Disadvantageously, for airborne applications, such as military or civilian satellite use, or for use within other types of spacecraft, such optical components significantly add to the size, weight and cost of the LIDAR receiver. What is needed, therefore, is a LIDAR receiver that provides the desired imaging and ranging information without the need for separate optical paths, thereby allowing the size, weight and cost of the LIDAR receiver to be significantly reduced.

In dual-detector LIDAR receivers of the prior art, an image intensifier is used in one of the optical paths to bring the intensity of an image to a level that allows it to be sensed by an imaging detector, such as a CCD camera. See, e.g., U.S. Pat. No. 3,128,408 for a description of a basic image intensifier. The image intensifier may be a proximity focused image intensifier, which includes an opaque photocathode, a microchannel plate (MCP) electron multiplier, and a phosphor coated anode. The photocathode is electrically biased so as to accelerate electrons toward the MCP. The MCP has an electrical bias applied thereto that allows electrons flowing thereacross to be multiplied by a factor of 100 to 100,000. The phosphor coated anode and exit side of the MCP are biased so as to accelerate electrons toward the phosphor anode. When the electrons strike the phosphor, the phosphor is excited and photons are emitted, thereby providing an image—an intensified image—of the incoming optical signal. Unfortunately, the time delay between the instant the electrons strike the phosphor and the time that an image is formed and may be processed by a suitable CCD camera is too long to allow the image to be used for ranging purposes. In other words, the CCD camera has too low of a bandwidth to provide useful ranging information.

In the other optical path of the dual-detector LIDAR, a silicon avalanche photodiode (APD) is used as the ranging detector. Advantageously, the APD provides one of the highest sensitivities of known photodetectors. However, in order to achieve its highest gain, an APD must be biased at levels that increase its "popcorn noise" and other noise, thereby limiting the effective sensitivity that the APD could otherwise achieve. Hence, what is needed is a photodetector that may be used to provide ranging detection within a LIDAR receiver that offers the same or better sensitivity as an APD detector, but without the limitations of the APD when used at the bias voltages required within a LIDAR receiver.

Thus, in summary, there is an unfilled need in the art for an imaging and ranging LIDAR receiver that offers higher sensitivity, lighter weight, more compact size, and lower cost than has heretofore been achievable. The present invention advantageously addresses these and other needs.

SUMMARY OF THE INVENTION

The present invention provides an integrated LIDAR receiver that includes a single detection element which provides both imaging and ranging functions. The single detection element includes an opaque photocathode, a microchannel plate (MCP) electron multiplier, and a phosphor coated anode covered with a metalized layer. The metalized layer on the phosphor anode allows some of the electrons striking the anode to be detected as a prompt electrical current. The detection of the prompt electrical current is made through a transformer that couples the anode to a power supply. The power supply biases the anode relative to the MCP and photocathode such that the MCP is grounded, with the anode being biased positively relative to the MCP, and the photocathode being biased negatively relative to the MCP. The use of a transformer advantageously allows the prompt anode current to be detected without having to ground the anode. The use of a non-grounded anode significantly simplifies the power supply circuitry. The detection of the prompt electrical current provides a first output signal useful for ranging information. A second output signal is the visible light (photons) excited in the phosphor coated on the anode. Such light represents an intensified image of a scene, and may thereafter be detected by an imaging sensor, such as a CCD camera.

An important aspect of the present invention is the use of a metalized film covering the phosphor anode. Metalized films have been used before to act as a reflector to assure that all of the photons are directed out of the backside of the anode to the imaging sensor. However, the present invention also uses the metalized film to detect a prompt anode current. Advantageously, the bias voltage appearing across the phosphor coated anode and metalized film is controlled so as to provide a desired division between those electrons that enter the phosphor anode (used for imaging purposes) and those that remain in the metalized layer (used for ranging purposes). In other words, unlike prior art image intensifiers, the present invention recognizes that not all of the electrons striking the anode need enter the phosphor so that their energy can be used to emit photons. Rather, the bias voltage used in conjunction with the anode is adjusted so that just enough electrons enter the phosphor to provide an optimum amount of light for the imaging sensor operation.

In accordance with another aspect of the present invention, the image intensifier is biased so that the MCP is grounded, either at its input side or its output side. This allows the anode to be biased positively with respect to the MCP, and the photocathode to be biased negatively with respect to the MCP. Such is in contrast to a biasing scheme that grounds the anode, as disclosed in applicants' copending U.S. patent application, Ser. No. 07/831,403, filed Feb. 5, 1992. While grounding the anode is conceptually a sound idea, a grounded anode configuration requires that the power supply be designed to withstand the entire voltage of the image intensifier stack, i.e., the stack comprising the photocathode, the MCP electron multiplier, and the phosphor coated anode. Such stack voltage may typically range in the neighborhood of 6-7 kV. The resulting power supply, in order to properly gate the photocathode, must thus utilize larger and heavier components, e.g., transformers and insulation, than would a power supply that did not need to withstand the entire stack voltage. Hence, by using a configuration that grounds the MCP rather than the anode, a smaller, less expensive, power supply may to used to provide the gated biasing voltages that are used during operation of the LIDAR imaging intensifier.

In accordance with a further aspect of the invention, a transformer is used to couple the anode to a detection circuit. When accelerated electrons strike the anode, a portion of the electrons comprise a prompt anode current that is immediately sensed through the transformer at a suitable detection circuit. Advantageously, use of the transformer in this manner to couple the prompt anode current to the detection circuit eliminates ground currents that could otherwise significantly hinder and complicate the detection process.

Advantageously, because the integrated LIDAR receiver of the present invention includes only one detection element, only one optical path is needed. Hence, the optics normally used for the second optical path of dual-detector LIDAR receivers of the prior art are eliminated. Further, because the return beam is not split, the full power of the return pulse may be used for both ranging and imaging functions. Moreover, the elimination of the second optical path greatly reduces the number of components used within the system, thereby reducing its overall weight. The elimination of the second optical path also reduces the overall size and cost of the integrated LIDAR receiver, and significantly simplifies the manner in which the LIDAR receiver may be implemented.

In operation, the gain of the integrated LIDAR receiver advantageously increases, thereby improving range sensitivity, while the excess noise decreases, as the bias voltage applied between the cathode and anode are adjusted to increase the anode current. This is in contrast to the silicon APD, wherein the excess noise increases with internal gain. Hence, the integrated LIDAR receiver of the present invention advantageously provides a higher sensitivity for range detection than does the standard silicon APD.

One embodiment of the present invention may be characterized as an inteorated LIDAR receiver. Such integrated LIDAR receiver includes: (1) an image intensifier having a cathode spaced apart from an anode, a microchannel plate (MCP) electron multiplier positioned intermediate the cathode and anode, the anode being made from a phosphor film that is deposited on a fiber optic substrate, and the phosphor film being coated with a metalized layer; (2) power supply means for selectively applying a first voltage potential between the MCP electron multiplier and the anode, with the MCP being maintained at substantially ground (zero) potential and the anode being positive relative to the MCP, and for selectively applying a second voltage potential between the MCP electron multiplier and the cathode, with the cathode being negative relative to the MCP; and (3) amplifier means coupled through a transformer to the metalized layer of the anode for converting pulses of electrical current detected at the metalized layer to voltage pulses. In operation, optical pulses striking the cathode of the image intensifier are manifest by the emission of electrons, which electrons are multiplied, and accelerated towards the anode. Statistically, a fraction of the electrons striking the anode pass through the metalized film into the phosphor film, causing photons to be emitted. Such photons thereafter are detectable through the fiber optic substrate, and provide imaging information. The remaining fraction of the electrons striking the anode remain in the metalized layer and serve as a prompt electron current, or anode current. The prompt electron current is coupled through the transformer and converted to a voltage pulse by the amplifier means. Because such voltage pulse occurs immediately (e.g., on the order of a nanosecond) after the time when the incoming optical pulses strike the cathode, such voltage pulse thus provides useful ranging information. In contrast, the electrons that enter the phosphor film conduct out on a longer time scale, and are thus less useful in providing ranging information.

In accordance with another embodiment, the present invention may be characterized as a LIDAR svstem that provides both ranging and imaging information relative to a target. Such LIDAR system includes the following elements:

(1) Means for generating and directing a pulse of radiant energy having a known wavelength towards the target in response to a trigger signal.

(2) An integrated LIDAR receiver for receiving radiant energy of the known wavelength reflected from the target. Such integrated LIDAR receiver includes: a cathode spaced apart from an anode, with electrons being emitted by the cathode in response to the cathode being impinged by radiant energy reflected from the target; and electron multiplier means positioned intermediate the cathode and anode. The electron multiplier means receives the electrons emitted from the cathode, and emits a larger number of electrons than thus received (i.e., it multiplies the number of electrons received). Further, the anode is made up of a first layer of a first selected material (e.g., phosphor) that is deposited on a fiber optic substrate, and a second layer of a second selected material (e.g., a metal, such as aluminum) that is placed over the first layer. A fraction of the electrons striking the anode pass through the second layer (the top layer) and cause photons to be emitted in the first layer. Such photons are thereafter detectable through the fiber optic substrate. Electrons striking the anode that do not pass through the second layer are detectable as a prompt anode current.

(3) Power supply means for selectively applying a first voltage potential between the MCP electron multiplier and the anode of the LIDAR receiver; and for selectively applying a second voltage potential between the MCP and the cathode. The second voltage potential causes electrons emitted by the cathode to be accelerated towards the MCP electron multiplier. The first voltage potential causes electrons emitted by the MCP electron multiplier to be accelerated towards the anode with a prescribed energy.

(4) Detection means for detecting the anode current and generating a return signal in response to such detection.

(5) Timing means for measuring the elapsed time between the trigger signal and the return signal.

(6) An image sensor coupled to the fiber optic substrate for generating an image signal responsive to photons impinging the image sensor through the fiber optic substrate.

(7) Processing means for generating the trigger signal, processing the image signal, and computing a range indication from the elapsed time measured by the timing means. Hence, both image and range information are provided relative to the target by detecting radiant energy of the known wavelength reflected from the target through the integrated LIDAR receiver.

The present invention may further be characterized as a method of determining both image and range information relative to a target using a single LIDAR detector. Such LIDAR detector includes at least a cathode spaced apart from an anode, with electrons being emitted by the cathode in response to the cathode being impinged by radiant energy reflected from the target. Further, the anode includes a phosphor layer covered with a metalized layer. Such method includes the steps of: (a) generating a pulse of radiant energy having a known wavelength and directing the radiant energy pulse at the target; (b) receiving radiant energy reflected from the target of the known wavelength at the cathode of the LIDAR receiver; (c) biasing the anode relative to the cathode such that electrons emitted from the cathode in response to the radiant energy received in step (b) are accelerated towards the anode with a prescribed energy, such prescribed energy being selected such that a fraction of the electrons striking the anode pass through the metalized layer into the phosphor layer and cause photons to be emitted, and a remaining fraction of the electrons striking the anode remain in the metalized layer and are detectable as an anode current; (d) detecting the photons generated in the phosphor layer and producing an image signal therefrom; (e) detecting the prompt anode current at the metalized layer; (f) measuring the elapsed time between the generation of the radiant energy pulse in step (a) and the detection of the prompt anode current in step (e); and (g) calculating the distance to the target based upon the elapsed time measurement of step (f)

It is thus a feature of the present invention to provide a LIDAR system or method that provides ranging and imaging information using a single detection element.

It is another feature of the invention to provide such a LIDAR system or method wherein such single detection element employs only a single optical path.

It is yet a further feature of the invention to provide such a LIDAR receiver that includes an image intensifier, having a cathode, multichannel plate electron multiplier, and phosphor anode deposited on an optical fiber substrate, with a metalized layer overlying the phosphor anode. The metalized layer advantageously provides a means for readily detecting a prompt anode current, which prompt anode current is generated simultaneously with the return of the optical return pulse.

It is an additional feature of the invention to provide a technique for detecting the prompt anode current of such a LIDAR receiver that does not require the anode to be grounded.

It is a further feature of the invention to provide such a dual-function LIDAR receiver—having a single optical path and providing both imaging and ranging functions—that is simpler, more reliable, more compact, lightweight, and less power consuming than has heretofore been achievable, thereby allowing a LIDAR system employing such a LIDAR receiver to be used for airborne, space or other applications, where size, weight and power are of primary concern.

It is an additional feature of the invention to provide a LIDAR receiver that provides improved sensitivity with respect to both imaging and ranging functions compared to the sensitivity of LIDAR receivers of the prior art.

It is yet another feature of the invention to provide a LIDAR receiver that does not use an avalanche photodiode detector, thereby avoiding the attendant problems associated with the use an avalanche photodiode detector (such as high dark current; excessive "popcorn noise", etc.).

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

As has been noted, the present application is a continuation-in-part of U.S. patent application Ser. No. 07/831,403, filed Feb. 5, 1992 (the '403 application). The '403 application is incorporated herein by reference in its entirety, including Appendix A of the '403 application.

Figure 1:
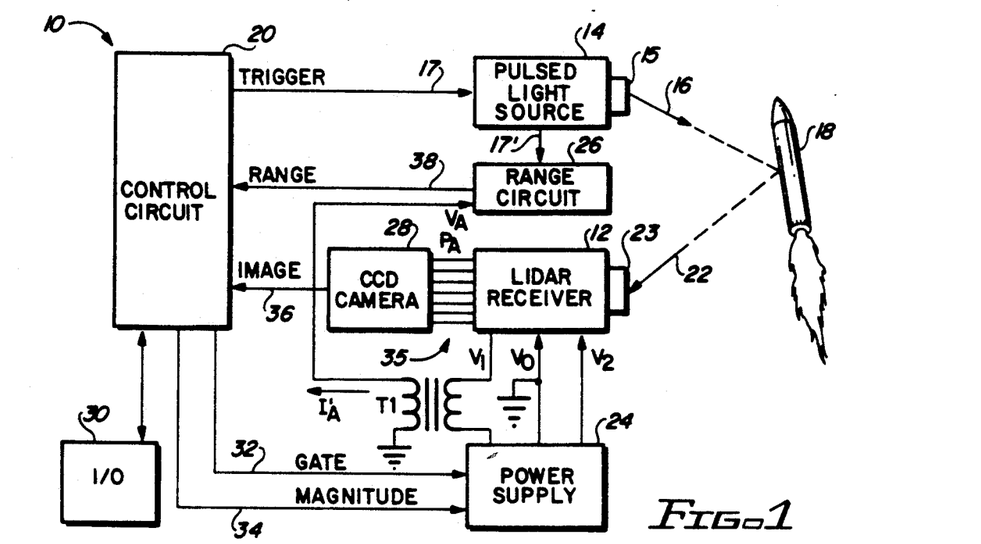
FIG. 1 is a block diagram of a LIDAR system that utilizes a LIDAR receiver made in accordance with the present invention.

Referring first to FIG. 1, there is shown a block diagram of a basic LIDAR system 10 that utilizes a LIDAR receiver 12 made in accordance with the present invention. The LIDAR system 10 includes a light source 14 that generates a pulse of intense light 16 in response to a trigger signal 17. The trigger signal 17 is generated by an appropriate control circuit 20 when it is desired to generate the pulse of light 16. Exactly coincident with the transmission of the light pulse 16, an auxiliary trigger signal 17' is generated. This trigger signal 17' provides a time reference from which ranging information may be determined, as explained below. The pulse of light 16 is directed at a suitable target 18, such as a moving rocket or missile, through an appropriate output optic system 15. A portion of the incident light pulse 16 is reflected from the target 18 back to the LIDAR receiver 12 as a reflected light pulse 22. The reflected light pulse 22 is received through a suitable optical channel 23 configured with appropriate lenses and other optical components, in conventional manner.

The LIDAR receiver 12 includes a photocathode (sometimes referred to simply as a "cathode"), at least one multichannel plate (MCP) electron multiplier, and an anode. The LIDAR receiver 12 is biased by a power supply 24. As depicted in FIG. 1, at least two bias voltages, $V_1$ and $V_2$, referenced to a ground potential, $V_0$, are generated by the power supply 24 and provided to the LIDAR receiver 12. The use of two bias voltages is only exemplary, as any number of bias voltages may be utilized by the LIDAR receiver depending upon its internal construction and the number of multichannel plate (MCP) electron multipliers used therein.

As is explained in more detail hereafter, for the preferred embodiment of the invention, the bias voltage $V_1$ may be positive relative to the ground potential, and is used to bias the anode. Similarly, the bias voltage $V_2$ may be negative relative to the ground potential, and is used to bias the cathode. One side of the MCP is grounded, i.e., connected to the ground potential, $V_0$. (It is understood, as is known in the art, that the MCP electron multiplier is also appropriately biased with a bias voltage relative to $V_0$ in order to accelerate the electrons therethrough. Such MCP bias voltage is not described herein but its presence is understood.) The bias voltage $V_1$ is applied to the anode of the LIDAR receiver 12, and the bias voltage $V_2$ is applied to the photocathode of the LIDAR receiver 12. Further, the bias voltage $V_1$ is applied to the anode through a transformer T1. Thus, as a prompt anode current $I_A$ is developed at the anode, such current flows through a primary winding of the transformer T1 and can be sensed through a secondary winding of T1 as a pickoff current $I'_A$ or pickoff anode voltage $V_A$.

In most LIDAR systems, the power supply 24 is controlled by the control circuit 20 so as to provide the requisite bias voltages to the LIDAR receiver 12 only during a narrow window of time when a return light pulse is expected. In this manner, the control circuit 20 effectively turns on, or "gates on", the LIDAR receiver only at certain times. Thus, the control circuit 20 generates an appropriate gate signal 32 that controls when the bias voltages $V_1$ and/or $V_2$ are provided to the LIDAR receiver 12 from the power supply 24. It is noted that, depending upon the internal construction of the LIDAR receiver, it may be necessary to gate on only one of the bias voltages, e.g., $V_2$, in order to effectively control the LIDAR receiver, e.g., by gating the cathode ON or OFF. Further, it is noted that the control circuit 20 generates other control signals 34, as needed, in order to control the magnitude of the bias voltages applied to the LIDAR receiver 12. As will be evident from the description that follows, adjusting the magnitude of the bias voltages allows desired operating parameters, such as focusing and intensifying (amplifying) functions, of the LIDAR receiver to be readily controlled.

Assuming that the appropriate bias voltages $V_1$ and $V_2$ have been applied, the LIDAR receiver 12 generates two output signals in response to the receipt of a reflected light pulse 22. The generation of these two output signals is explained more fully below. In general, however, a first output signal is a light signal, $P_A$, representative of electrons at the anode with sufficient energy to cause the emission of photons at the anode of the LIDAR receiver 12. A second output signal is an electrical current, $I_A$, representative of electrons at the anode with insufficient energy to cause the emission of photons.

The first output signal, the light signal $P_A$, is optically coupled, e.g., through an optical fiber(s) 35, to a suitable image sensor 28, such as a CCD camera. The CCD camera 28 includes a large array of small light sensors, with each small sensor in the array generating an appropriate electrical signal representative of the light intensity (number of photons) that fall thereon. In this manner, electrical signals are provided representative of the light intensity associated with each small sensor area, or pixel, of that portion of the target 18 from which the reflected light pulse 22 reflected. In combination, such signals thereby represent an image signal 36 that provides image information about the target. Such image signal 36 may be processed in conventional manner by the control circuit 20 for a desired purpose, e.g., to enhance the detected image using appropriate digital signal processing techniques, to store the image, to display the image, etc.

The second output signal, the electrical anode current $I_A$, is electrically coupled to a range circuit 26. Such coupling occurs through the transformer T1, with the current $I'_A$ or voltage $V_A$ being induced in the secondary winding of the transformer T1 in response to the current $I_A$ flowing in the primary winding of the transformer. The range circuit 26 includes an electronic timer circuit, or equivalent timing device, that is triggered or started by the trigger signal 17' generated coincident with the generation of the pulsed light source 14. The range circuit 26 also includes appropriate circuitry for receiving the secondary current $I'_A$ or anode voltage $V_A$ and using it (when of sufficient amplitude so as to evidence a valid return pulse 22) to stop the timer circuit that was started by the trigger signal 17'. Once stopped, such timer circuit thus provides a measure of the round-trip propagation time of the light pulse generated by the pulsed light source 14 to and from the target 18. Because the light pulse travels at a known velocity (the speed of light for the appropriate medium through which the light pulse propagates), such round-trip propagation time thus provides a range signal 38 from which ranging information can be calculated. For example, if the applicable speed of light is "c", and if the round-trip time measured in the timer circuit is "t", then the distance "d" or range to the target 18 is simply computed as $$d = tc/2.$$

Such distance can readily be computed by the control circuit 20 and used for a desired purpose, such as tracking the target 18, including estimating its trajectory; displaying the distance "d" on a suitable input/output (I/O) device 30, or the like.

The pulsed light source 14 may be realized using any suitable light source capable of generating a pulse of light with sufficient intensity to traverse the required path to and from the target 18. Typically, the pulsed light source 14 is realized using a laser that generates radiant energy at a precise wavelength. For example, for missile tracking purposes, a wavelength in the range of 5000Å may be employed. Knowing the wavelength of the emitted light pulse 16 allows a suitable filter to be used as part of the optical channel 23 in the front end of the LIDAR receiver 12 to restrict the incoming reflected light pulse 22 to the same wavelength. Such filtering significantly minimizes background and other irrelevant wavelengths that are not of interest for the ranging and imaging functions of the LIDAR receiver.

It is to be understood that although the target depicted in FIG. 1 is a moving rocket or missile, the invention is not limited to use with such an airborne type of moving target. Indeed, the LIDAR system and LIDAR receiver of the present invention may be used for numerous applications, such as providing imaging and ranging information for a stationary target relative to a moving platform, or for providing ranging and imaging information for a moving target relative to a moving platform, or for airborne targets, or for underwater targets, or surface targets, and the like. Indeed, the number of applications that may benefit from using a LIDAR system as herein described is very numerous.

Figure 2:
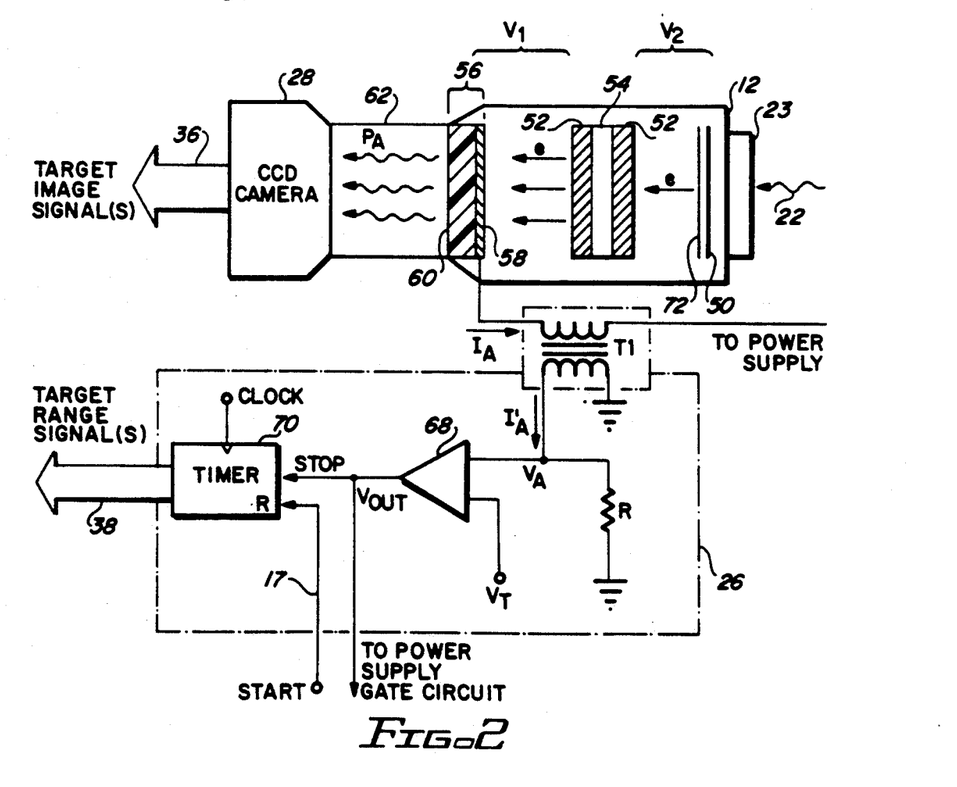
FIG. 2 is a block diagram of the LIDAR receiver and Range Circuits of the LIDAR system of FIG. 1.

Turning next to FIG. 2, a block diagram of the LIDAR receiver 12 and range circuit 26 is illustrated. As shown in FIG. 2, the LIDAR receiver 12 includes a cathode 50, a multichannel plate (MCP) electron multiplier 54, and an anode 56, similar to a conventional image intensifier. An optical channel 23 is located at a front end (where the "front end" is the end through which the incoming light 22 is received) of the receiver 12. The optical channel 23 includes appropriate optical components for receiving the incoming light 22. Such optical components include, e.g., conventional lenses and filters used to receive the incoming light 22 of the wavelength of interest. Positioned at or near the front end of the optical channel 23 is the cathode 50. The cathode 50 is made from an opaque material, such as S-20 (tri-alkali), and thus prevents any of the incoming light 22 from entering any further into the receiver 12. The cathode emits electrons "e" in proportion to the intensity of the incoming light 22 that strikes its front surface.

The MCP electron multiplier 54 is spaced downstream from the cathode 50, where "downstream" refers to the normal direction of electron or photon flow within the receiver 12, i.e., to the left as shown in FIG. 2 with the front end of the receiver 12 being on the right. The MCP 54 includes an array of millions of glass capillaries (channels) having diameters of 6-20 μm fused into a disk less than 1 mm thick. The inside walls of each channel are coated with a secondary electron emissive material having a specified resistivity. Both ends of each channel are covered with a thin film of metal that acts as an electrode. Each channel acts as an independent secondary electron multiplier. MCP electron multipliers are described in the art. See, e.g., Wiza, Joseph L., "Micro Channel Plate Detectors," *Nuclear Instruments and Methods.* Vol. 162, pp. 587-601 (1979). The MCP 54 is electrically biased with the bias voltage $V_2$ relative to the cathode 50 so as to attract the electrons emitted from the cathode 50. The electrons that strike the MCP cause other electrons to be emitted from the MCP such that the number of electrons emitted from the MCP is much greater than the number of electrons that strike the MCP, as described above. In this manner, the MCP "multiplies" the number of electrons emitted from the cathode 50. (As mentioned above, there is also a third bias voltage that accelerates the electrons through the MCP.)

The multiplied electrons emitted from the MCP 54 are accelerated towards the anode 56 by the bias voltage $V_1$. The energy of the electrons that strike the anode 56 is a function of the bias potential through which the electrons have been accelerated. That is, the bias voltage $V_1$ controls the energy associated with electrons that strike the anode. The anode 56 includes a layer of phosphor 60, or equivalent material, that photons, $P_A$, in proportion to the energy of the electrons that enter the phosphor. The phosphor layer 60 is deposited on an fiber optic substrate 62, much like paint is brushed or sprayed onto a surface. Thus, as electrons trigger the release of photons $P_A$ in the phosphor layer 60, such photons are detectable through the fiber optic substrate 62, e.g., by CCD camera 28. The CCD camera, in turn, converts the detected photons to appropriate electrical signals that represent target image signals that may be appropriately processed by the control circuit 20, or equivalent processor.

It is noted that the use of CCD camera 28 as a photon sensor to detect the photons $P_A$ is only exemplary. Any suitable sensor or detector that is optically coupled to the back of the fiber optic substrate 62 (where "back" refers to the phosphor layer side of the anode 56) could be used for such photon detection purpose.

As described in the preceding paragraphs, the LIDAR receiver 12 performs the function of an image intensifier. That is, incoming light 22 is converted to electrons, the number of electrons are amplified (multiplied), and then accelerated towards a phosphor surface (the anode), where the energy of the accelerated electrons is converted back to light (photons). However, because the number of electrons are multiplied and the energy associated with the electrons is increased, the image (as defined by the photons created at the anode) that is detectable at the anode (through the fiber optic substrate) is greatly intensified over that which would be available without such electron multiplication and increased electron energy.

Image intensifiers are, of course, known in the art. The present LIDAR receiver 12, however, is more than an image intensifier. While it performs the image intensifying function as described above, it also provides a target range signal. The target range signal is a prompt anode current that is detectable via a metalized layer 58 placed over the top of the phosphor layer 60. The metalized layer serves two primary functions: (1) it reflects the photons that are generated in the phosphor layer 60 towards the back of the fiber optic substrate 62, where they can be detected, as in prior art image intensifiers; and (2) it captures a fraction of the electrons striking the anode to provide a prompt anode current $I_A$. (The number of electrons that are captured by the metalized layer is determined statistically as a function of the energy of the electrons and the thickness of the metalized layer.) Advantageously, the prompt anode current $I_A$ appears coincident with the electrons striking the anode. The electrons strike the anode, in turn, given the relatively short dimensions of the LIDAR receiver, substantially coincident with the receipt of a pulse of light 22 at the cathode 50 of the LIDAR receiver. Thus, at substantially the same instant of time that a pulse of light 22 enters the LIDAR receiver 12, a pulse of anode current $I_A$ is generated. Hence, the above current may be referred to as a "prompt" anode current.

The anode current $I_A$ flows through a primary winding of a transformer T1 The inductance of the primary winding generates a voltage across the primary winding. A voltage is then induced at a secondary winding of the transformer T1, in conventional manner. The voltage induced at the secondary winding has an amplitude that is a function of the turns ratio of the primary winding to the secondary winding. The secondary voltage is amplified in a first amplifier, forming an anode voltage $V_A$. The anode voltage $V_A$, generated in response to the anode current $I_A$, is directed to a threshold amplifier 68 where it is compared to a threshold reference voltage $V_T$. If the anode voltage $V_A$ exceeds the threshold reference voltage $V_T$, then the output voltage $V_O$ of the threshold amplifier 68 assumes one of two possible values, e.g., a high value. If the anode voltage $V_A$ does not exceed the threshold reference voltage $V_T$, then the output voltage $V_O$ of the threshold amplifier 68 assumes the other possible value, e.g, a low voltage. Thus, so long as an anode current $I_A$ is present of a sufficient magnitude to cause the resulting anode voltage $V_A$ to exceed the threshold reference $V_T$, the output of the threshold amplifier 68 assumes a prescribed state, e.g., a high voltage. Otherwise, the output of the threshold amplifier 68 assumes the other state, e.g., a low voltage. In other words, when a pulse of anode current $I_A$ is generated as a result of a pulse of incident light 22 falling upon the cathode 50, such pulse (if of sufficient magnitude) causes the threshold amplifier 68 to change states, e.g., to produce a voltage pulse. Such voltage pulse is used to stop a timer circuit 70, which timer circuit 70 is started coincident with the generation of the light pulse 16 that is directed at the target 18 (see FIG. 1).

The transformer T1 is realized using a high permeability core, e.g., a torodial core made from MnZn ferrite material, having a primary winding made of approximately 10 turns of #24 stranded wire; and a secondary winding made of approximately 100 turns of #39 wire.

Such a core is available commercially from TDK as a T14-7-3.5 H5A core, having an $A_L$ (inductance parameter of the toroid) of approximately 2750. The indicated turns ratio is, of course, only exemplary, as numerous turns ratios, wire sizes, and core types could be used depending upon the particular design of the LIDAR receiver that is used, as well as the particular application with which the LIDAR receiver is used.

The transformer T1 and associated circuitry used to detect and process the prompt anode current may be considered as a "pickoff circuit" that picks off the prompt anode current without adversely affecting the optimum biasing scheme needed for the efficient and inexpensive operation of the LIDAR receiver and its associated power supply.

Advantageously, use of the pickoff circuit (i.e., use of the transformer T1 and its associated circuitry) as described in FIG. 2 allows the prompt anode current $I_A$ to be picked off from the LIDAR receiver 12 without having to ground the anode 56. (Grounding the anode is described in previously cited '403 patent application.) Grounding the anode of an intensifier, while offering the advantages indicated in the '403 application, has the disadvantage of requiring a gated power supply design capable of withstanding the entire voltage of the intensifier stack. (The intensifier "stack" is the anode, MCP and photocathode.) Such stack voltage may, for typical LIDAR applications, be in the 6000–7000 volt range. While gated power supplies can and are built to withstand such voltages, such gated power supplies require larger and more costly components than do power supplies that do not have to withstand such voltages. Hence, by using the transformer T1, a gated power supply, or power supplies, may be used that are much smaller and less costly than would be required if the anode were grounded.

Further, being able to pickoff the anode current without grounding the anode, e.g., when the anode is at a high voltage, allows Generation III phototransducer technology to be employed within the LIDAR receiver of the present invention. The term "Generation III" is normally used to refer to a gallium arsenide photocathode, which type of photocathode typically has a peak 20-25% quantum efficiency (QE), and may have a QE of up to 40% or higher (up to 60%) at a wavelength of 5320Å. See, e.g., Edgecumbe, et al., "A GaAsP Photocathode with 40% QE at 550 nm, *SPIE Proceedings*, Vol. 1655; SPIE/IS&T Symposium on Electronic Imaging: Science and Technology, Electron Tubes and Image Intensifiers (San Jose, CA, Feb. 9-14, 1992), incorporated herein by reference. As described in Edgecumbe, et al., a photocathode having such a high QE is realized using a multilayer photocathode that employs an alloy of GaAs and GaP in a transmission mode GaAsP/AlGaAsP photocathode, grown by vapor phase epitaxy (VPE) on GaAs substrates. Utilizing a photocathode having a QE greater than 40% greatly enhances the performance capability of the invention. Generally, however, a GaAs-based phototransducer must be biased at around 600–800 volts relative to the MCP, potentially causing the stack voltage to be even higher than it would be otherwise. Thus, being able to pickoff the anode current without concern for how high the stack voltage may go is a significant advantage offered by the present invention.

Using the prompt anode current $I_A$ as an indicator of the incoming optical signal represents the ideal signal for ranging purposes. Attempts to pick off an appropriate signal elsewhere within the LIDAR receiver have not proven successful. A photocathode current, for example, is too weak (small) to be of much use. An MCP current cannot be picked off without totally redesigning the MCP. Hence, an anode current represents the best possible choice. Further, by using transformer coupling as shown in FIG. 2, undesirable ground loops between the power supply and the LIDAR receiver are avoided.

The timer circuit 70 may be realized using a simple counter circuit, numerous types of which are commercially available, configured to count the pulses, or periods, of a suitable clock signal, identified in FIG. 2 as "CLK". The clock signal is selected to be a suitably high frequency, e.g., 150 Mhz, so as to allow a time resolution of just a few nanoseconds to be obtained based on the count held in the timer circuit, allowing a linear resolution of approximately 1 meter. The clock signal may be derived from a conventional oscillator (not shown in FIG. 2), which oscillator may comprise one of the circuits of the control circuit 20 (FIG. 1).

Figure 3A:
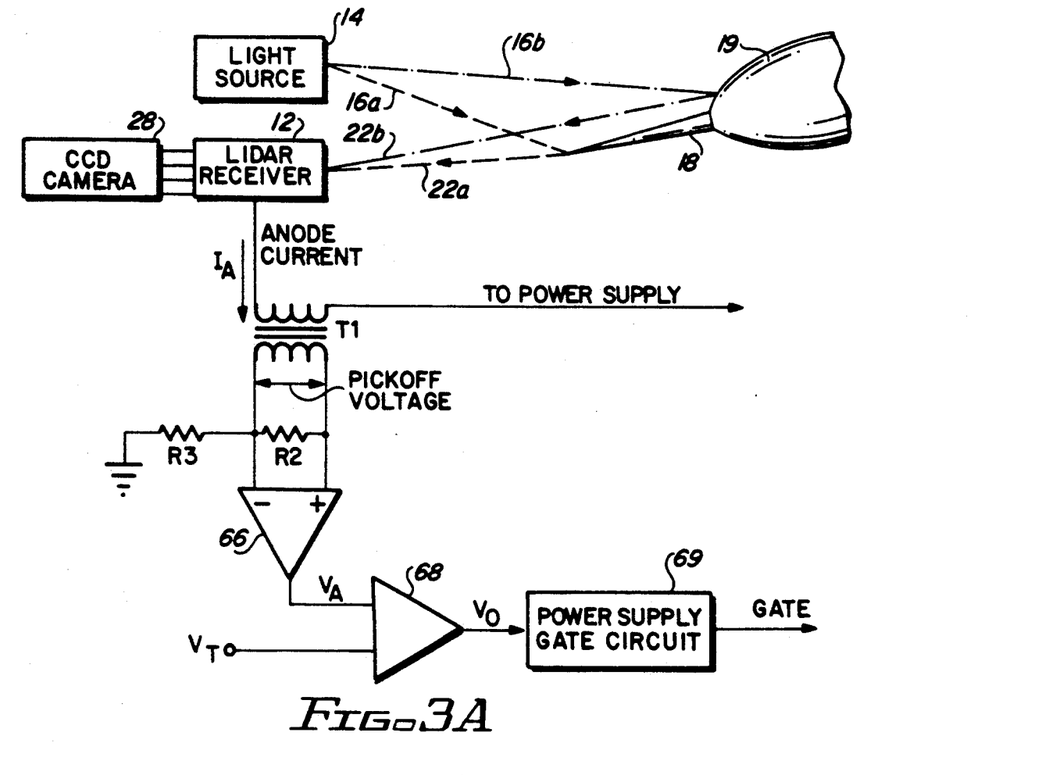
FIG. 3A is a block diagram of a portion of a LIDAR system illustrating the use of a power supply gate circuit to shutdown the LIDAR power supply in order to effectively discriminate between a return pulse from a target and its background.

As seen in FIG. 2, the output voltage $V_{OUT}$ of the threshold detector 68 may also be used to trigger a power supply gate circuit 69 as shown in FIG. 3A. Such a gate circuit 69 offers the capability of allowing the LIDAR system 10 to effectively discriminate between a target and the target's background, particularly where the target's background is such that it might also reflect a return pulse to the LIDAR receiver. Thus, as seen in FIG. 3A, a target 18 (which may be a missile or rocket) includes a plume 19. When the target 18 is coming towards the LIDAR system 10, a pulse of light 16a from the LIDAR system's light source 14 strikes the target, and is reflected back to the LIDAR receiver as a return pulse 22a. A pulse of light 16b from the light source 14 may also strike the plume 19 of the target 18, causing a return pulse 22b to return to the LIDAR receiver 12. If the LIDAR receiver 12 processes both the target return pulse 22a and the background return pulse 22b, it may be difficult to separate the target from its background in the image information that is detected.

Advantageously, by using the circuitry shown in FIG. 3A, the invention is able to effectively discriminate between the target and its background for some target geometries. For example, if the target is coming towards the LIDAR system, as shown in FIG. 3A, then appropriate gating may be used to discriminate the target from its background. Thus, as the target moves towards the LIDAR system, the target 18 is closer to the LIDAR receiver than is its background. Hence, the return pulse 22a from the target arrives at the receiver 12 sooner than does the return pulse 22b from the background. That is, if the target is a missile having a length of 5 meters, for example, then the return pulse 22a from the front tip of the target will arrive at the LIDAR receiver approximately 33 nanoseconds before the return pulse 22b. Hence, in accordance with the present invention, the leading edge of the return pulse 22a is immediately processed and is used to trigger the power supply gate circuit 69. The power supply gate circuit 69, in turn, gates the LIDAR receiver OFF (switches the bias voltage $V_1$ and/or $V_2$) so that it no longer detects any incoming pulses. Thus, when the return pulse 22b arrives at the LIDAR receiver 12, it is not received because the LIDAR receiver has been gated OFF.

Figure 3B:
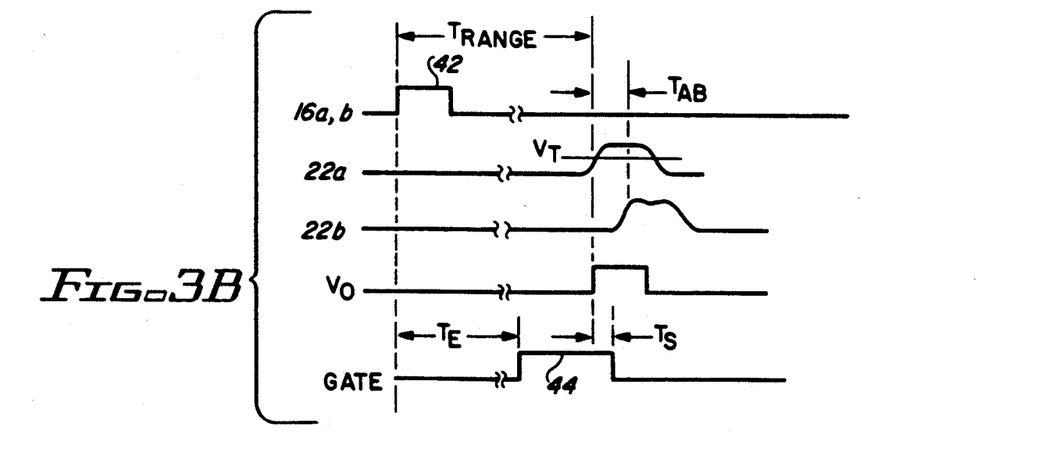
FIG. 3B is a timing diagram illustrating the operation of the LIDAR system shown in FIG. 3A.

To better illustrate the operation of the LIDAR receiver 12 as it discriminates between a target and the target's background, consider the timing diagram shown in FIG. 3B. In FIG. 3B, the light pulse 16a or 16b from the pulsed light source 14 is represented as a pulse 42. After the pulse 42 travels to and from the target 18, a return pulse 22a is received. The time between the leading edge of the transmitted pulse 16a and the leading edge of the return pulse 22a represents the round trip propagation time of the pulse, $T_{RANGE}$. It is from this time $T_{RANGE}$ that the ranging information for the LIDAR system is obtained. For appropriate target geometries, the background return signal 22b, which follows the target return signal by only tens of nanoseconds, is filtered out. That is, the return pulse 22a, which represents the voltage $V_A$ developed across the load R as a result of the prompt anode current $I_A$, is compared to a threshold $V_T$ in a threshold detection circuit 68. The leading edge of the output signal, $V_0$, of the threshold detection circuit 68 is applied to the power supply gate circuit 69, in order to gate the photocathode off, thereby filtering out the background return pulse 22b.

The power supply gate circuit 69 provides a gate signal 44 that turns ON the LIDAR receiver 12 during a time when a return pulse is anticipated. Typically, this will be a time $T_E$ after the generation of the pulse 42. For an anticipated target range of 3-5 km, for example, $T_E$ may be on the order of 30-100 microseconds. As soon as the leading edge of $V_0$ goes high, however, e.g., within 5-10 nanoseconds thereafter, the power supply gate circuit causes the gate signal 44 to go low, thereby turning OFF the LIDAR receiver, e.g., by biasing the photocathode 50 so that it does not respond to photons incident thereto. Thus, by the time the leading edge of the background return pulse 22b is received at the LIDAR receiver 12, which is a time $T_S$ after the leading edge of the return pulse 22a has been received, the LIDAR receiver 12 has been turned OFF, thereby blocking the receipt of the return pulse 22b. Hence, in this manner, the image detected at the CCD camera 28 is due solely to the photons in the target return pulse 22a, not the photons in the background return pulse 22b.

Figure 3C:
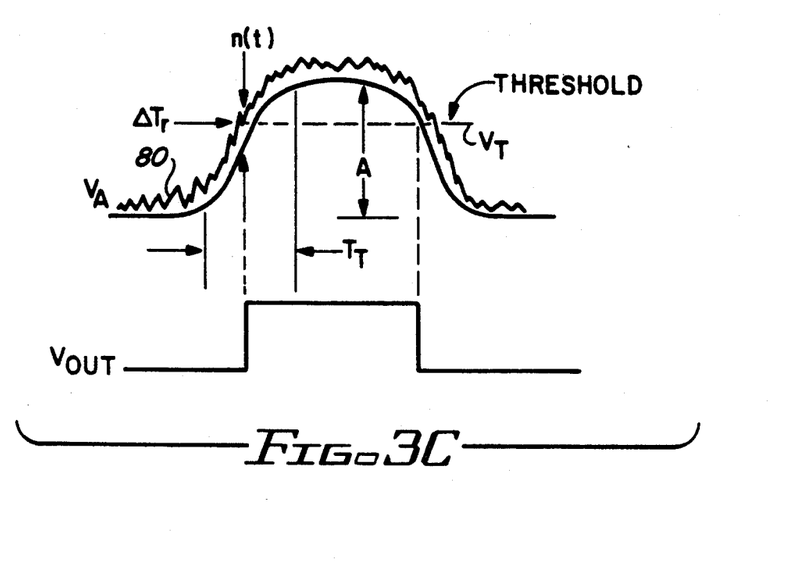
FIG. 3C illustrates a return pulse as processed by the range circuits of FIG. 1, and defines some of the parameters that influence range accuracy.

To further illustrate the operation of the range circuit 26, reference is next made to both FIGS. 2 and 3C. FIG. 3C shows a timing waveform diagram that includes a return pulse as processed by the range circuit 26. The return pulse shown in FIG. 3C is assumed to be the anode voltage pulse $V_A$ developed as a result of the anode pickoff current $I_A$. However, because such pulse is directly derived from the pickoff anode current pulse $I'_A$, which current pulse, in turn, is induced by the prompt anode current, $I_A$, related directly to the return light pulse 22, the pulse shown in FIG. 3C is directly representative of the return light pulse 22. It is assumed that the pulse $V_A$ has "noise" riding thereon, which noise is represented symbolically as a jagged line 80. The pulse has a finite rise time $T_T$ associated therewith. As the voltage level of the pulse rises from its initial ground (zero volts) condition up to its peak value, "A", it crosses the threshold voltage $T_T$. As soon as the voltage $V_A$ exceeds $V_T$, the output voltage, $V_0$, of the threshold detector 68 changes state (going, e.g., from a low voltage to a high voltage). So long as the anode voltage $V_A$ remains above the threshold reference value $V_T$, the output state of the threshold detector 68 does not change. As soon as the anode voltage $V_A$ goes below the threshold level $V_T$, the state of the threshold detector 68 changes back to its initial state (going, e.g., from a high voltage to a low voltage).

The leading edge of the pulse $V_{OUT}$ is used to stop the operation of the timer circuit 70. (As explained above in connection with FIGS. 3A and 3B, this leading edge of the pulse $V_{OUT}$, or an equivalent leading edge, such as the leading edge of the picked-off anode voltage $V_A$ or current $I'_A$, may also be used, in some embodiments of the invention, to trigger the power supply gate circuit 69.) The timer circuit 70 is started at a time coincident with the generation of the original light pulse 16 directed at the target 18. Thus, during the entire time that the light pulse 16 is propagating towards the target 18, and during the time that the reflected return pulse 22 is returning from the target 18, the counter 70 is counting each cycle of the clock signal. Thus, when the timer is stopped by the leading edge of the pulse $V_0$, the counter contains a count of the time $T_{RANGE}$ (FIG. 3B), which time provides an accurate measure of the elapsed time (number of clock periods), and hence the distance, to the target as explained above.

Advantageously, the present invention provides a convenient mechanism for controlling the number of electrons received at the anode that do not emit photons, and the number of electrons received at the anode that are captured in the metalized layer and do not emit photons, which electrons cause the prompt anode current $I_A$ to be generated. Such mechanism comprises controlling the number of electrons that are allowed to pass through the metalized layer 58 into the phosphor layer 60. Such number is determined statistically as a function of at least two variables. The first is the thickness of the metalized layer 58. The second is the energy of the electrons that strike the metalized layer.

The thickness of the metalized layer is a physical parameter. If the metalized layer is extremely thin, most electrons will pass therethrough into the phosphor layer. If the metalized layer is extremely thick, few electrons will be able to pass therethrough into the phosphor layer. In general, the physical thickness of the metalized layer is selected as a tradeoff between providing a good reflective surface for the photons and allowing a sufficient number of electrons to pass therethrough. Such physical thickness may be selected in accordance with known design factors used in the image intensifier art.

The energy of the electrons that strike the metalized layer is a function of the bias voltage $V_1$ applied between the MCP 54 and the anode 56. The higher the bias voltage, the more the electrons are accelerated as they leave the MCP, and the more energy they have when they strike the anode. The bias voltage $V_1$, for example, may be around 5000 volts (5 kV), thereby placing the MCP at 5 kV above the anode (which is maintained at ground). Such a biasing scheme would thereby accelerate the electrons emitted by the MCP to an energy of 5000 electron volts (5 KeV) when they strike the anode.

As the energized electrons enter the metalized layer 58, they begin, on average, to lose their energy. If the layer 58 is sufficiently thick, they lose all their energy, and do not enter the phosphor layer 60. For purposes of the present invention, it is desired that the electrons have an appropriate energy as they strike the metalized layer so that at least a statistically determined fraction of the electrons will make it into the phosphor layer 60 where they can cause photons to be emitted, while others of the electrons will statistically remain in the metalized layer where they can contribute to the prompt anode current $I_4$. To this end, it is convenient to refer to the thickness of the metalized and phosphor layers in terms of kV, rather than in terms of a physical dimension. For example, if the thickness of the metalized layer is 2 kV, and if the bias voltage $V_1$ is 5 kV, then the energy of the electrons entering phosphor layer is 3 kV. Advantageously, the bias voltage $V_1$ can be adjusted, as required, in order to control the number of electrons that enter the phosphor layer 60 so as to cause just the right number of photons to be emitted to provide an optimum amount of light for operation of the CCD camera 28 (or equivalent photon sensor). Thus, the present invention recognizes that not all of the electrons that strike the anode need to be of sufficient energy to cause the emission of photons, as is the case with image intensifiers of the prior art. For a bias voltage $V_1$ of 5 kV, the thickness of the metalized layer 58, expressed in terms of volts, can thus vary from 0 to 5 kV. Typically, the thickness will range from 0–3 kV, so that anywhere from 5 to 2 kV of electron energy is released in the phosphor layer 60.

The metalized layer 58 may be realized from aluminum (Al), or other metals having similar properties (e.g., good optical reflective properties, and a low Z), such as beryllium (Be).

Still referring to FIG. 2, it is preferred that an undercoating 72 also be employed on the underneath (back) side of the cathode 50. The undercoating is used to improve the conductivity of the cathode, and the undercoating material should thus be a good electrical conductor. A preferred material for the undercoating is nickel (Ni), but other conductive materials, such as aluminum (Al) or inconel, could also be used.

An example of a LIDAR receiver 12 made in accordance with the present invention includes a modern low-resistance photocathode 50 made from S-20 (trialkali) having a diameter of 12 mm. A suitable undercoat of Ni is placed on the back side of the photocathode 50. Such a small 12 mm diameter intensifier inherently has less photocathode strip resistance than would a larger diameter tube, thereby improving its gating characteristics (i.e., the ability to quickly gate the device ON or OFF). Gating is normally achieved by switching the polarity of the bias voltage $V_2$ from, e.g., $-200$ V (ON) to $+50$ V (OFF), where the voltage is measured relative to the MCP electron intensifier 54. Some applications require very fast gating, e.g., less than 10 nanoseconds, while other applications (such as tracking a rocket or missile) may utilize a longer gating period, e.g., 30–100 nanoseconds, or more. Tens of nanosecond gating is achievable using a conventional photocathode without an undercoating.

Continuing with the example of the LIDAR receiver, the MCP electron multiplier 52 is positioned approximately 0.2 cm from the photocathode 50, and is realized using a Micro Channel Plate commercially available from, e.g., Hamamatsu Photonics K.K. of Hamamatsu City, Japan. (Such an MCP may also be obtained from Galileo of Sturbridge, Mass.; or Litton Electron Devices of Tempe, Ariz.) Such MCP devices are commonly used in image intensifiers of the prior art. The anode 56 is positioned approximately 1.2 mm from the MCP 54, and includes a fiber optic substrate on which a coating of phosphor is deposited. The phosphor, in turn, is coated with a layer of Al. The layer of Al may be readily applied to the phosphor wafer, as well as the undercoating layer of Ni applied to the GaAs photocathode, using vapor deposition techniques known in the art. The thicknesses of the layers are the same as are known and practiced in the image intensifier art. The bias voltage $V_1$ is initially set at approximately 5 kV, so that for the given physical thickness of the Al layer, the Al layer has an effective thickness of about 3 kV.

A suitable electrical connection is made to the Al layer to connect it to one end of a primary winding of a transformer T1, with the other end of the primary winding being connected to the power supply that provides the bias voltage $V_1$. The transformer T1 may be as previously described. A secondary winding of the transformer T1 has both ends connected to the positive and negative inputs of a suitable differential amplifier circuit 66 (FIG. 3A), e.g., an operational amplifier. A resistor, e.g., of 10 K$\Omega$, is connected between the inputs of the operational amplifier (i.e., is connected across the secondary winding), and another resistor, e.g, of 1 K$\Omega$, is connected from one of the inputs of the amplifier 66, e.g., the negative input, to ground. The output of the amplifier 66 is coupled to one of the inputs of the threshold amplifier circuit 68, with the other input of the threshold circuit being connected to a suitable threshold voltage 68.

The fiber optic substrate is made from a fiber optic bundle, made from fiber optic rods of approximately 6 $\mu$m diameter and 1.0 cm length. Such fiber optic rods are commercially available from numerous sources, such as Collimated Holes, Inc. of Campbell, Calif. An appropriate CCD camera 28, such as the TH7883, commercially available from Thompson Components and Tubes, Corp., of Totowa, N.J., is then optically coupled to the end of the fiber optic bundle so as to receive any photons emitted in the phosphor anode. Again, such CCD cameras are commonly used with image intensifiers of the prior art.

As thus described, it is seen that the LIDAR receiver 12 may be readily assembled and manufactured from components commonly available in the intensifier art, and by using manufacturing techniques also known in the art. Thus, no new components or assembly skills are needed. Advantageously, such LIDAR receiver employs only a single optical path and does not require the use of the avalanche photodiode (APD) as a detector element. By avoiding the use of the APD, numerous problems are avoided, and several advantages are realized, resulting in overall improved sensitivity. For example, by using a dual-microchannel plate the noise image intensifier function of the receiver is photon limited, thereby providing a significantly superior sensitivity. (Note, any number of MCP's may be stacked, connecting the MCP's in series so that additional gain is realized. When two MCP's are thus stacked, a "dual microchannel plate" results.) Thus, if the scene is background limited, i.e., if the dominant noise is from the target itself (e.g., the plume of a rocket) or the target's background (e.g., the sun), the LIDAR receiver of the present invention can provide a usable signal before a noisier less-sensitive detector can. Further, since target illumination must ultimately come from the transmitter (the light source 14), the superior receiver sensitivity ensures maximum utilization of the source illumination, thereby minimizing transmitter mass and power.

Moreover, because the APD has a significantly higher dark current (the current present with the blocking of all input light) than does the LIDAR receiver of the present invention, the resultant noise current from the present LIDAR receiver is less than 0.5% compared to that of the APD. (It is the dark current of the APD, which prevents it from photon limiting.) Because there is a smaller excess noise factor with the LIDAR receiver of the present invention, there is thus an improved signal-to-noise ratio, meaning, that there is a greater certainty than an output voltage $V_A$ of a prescribed magnitude will result. This allows a margin in setting the threshold level $V_T$ to ensure that even weak signals can be detected.

Still further, it is noted that as the bias voltage of an APD is increased (which controls the gain), microplasmas are produced in the semiconductor bulk. Such microplasmas result in system signals that appear suddenly, just as popcorn suddenly pops, and may even appear as valid signal returns. When such "popcorn noise" does appear, the false alarm rate of the APD-based system thus significantly increases. In contrast, the LIDAR receiver described herein, by avoiding the use of APD's, provides an optimized system that does not produce "popcorn noise" regardless of gain. Moreover, as the gain of the intensifier is pushed to its limit, the response of the dual MCP 54 actually becomes more Gaussian, resulting in a still lower excess-noise factor and, therefore, improved sensitivity.

Figure 4:
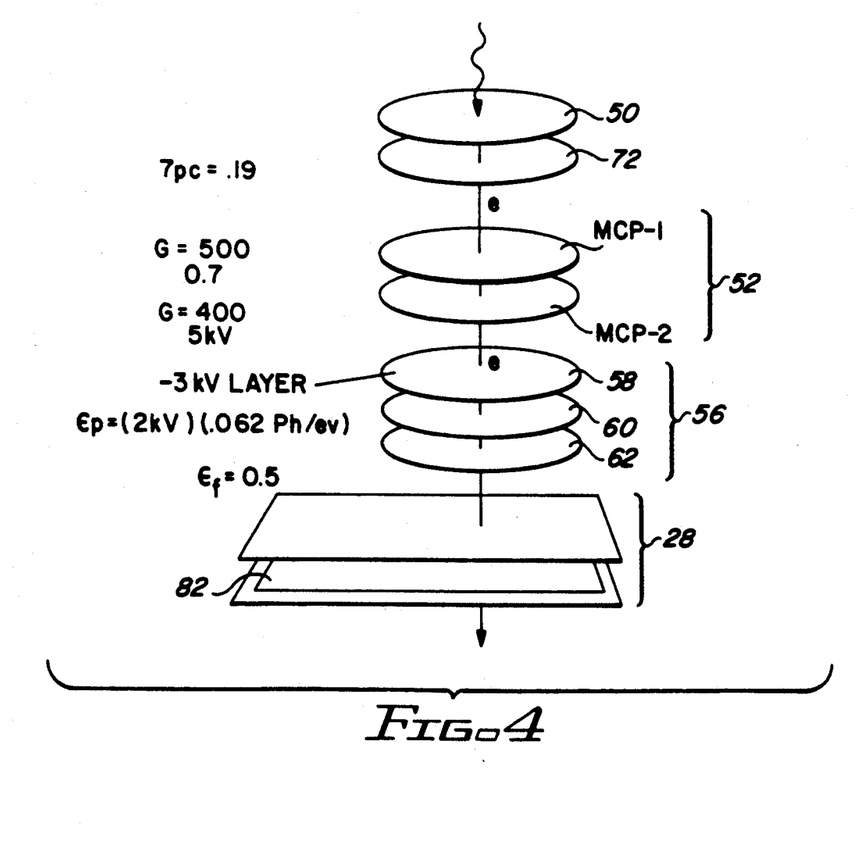
FIG. 4 schematically depicts a LIDAR receiver made in accordance with the present invention, and illustrates the various bias voltages that are applied thereto.

The photon gain that is achievable using a LIDAR receiver 12 as described above is best described with reference to FIG. 4. FIG. 4 schematically depicts the elements of a dual-plate image intensifier as used in the LIDAR receiver 12. Thus, schematically shown in FIG. 4 is the photocathode 50, the cathode undercoat 72, the two plates of the MCP electron intensifier 52, (referred to as MCP-1 and MCP-2), the metalized layer 58 and phosphor layer 60 of the anode 56, the fiber optic substrate 62, and the CCD camera 28, including a CCD array 82. The photon gain is the product of the photocathode's quantum efficiency, $\eta_{pc}$, electron gain, $G_e$, phosphor conversion efficiency, $\epsilon_p$, and the light coupling efficiency into the fiberoptic output, $\epsilon_f$. The phosphor conversion efficiency is 0.062 photons/(electron-/eV). A photoelectron mapping efficiency into the channelplate pores is typically 0.7 and may be folded into the effective gain of the first and second microchannel plates MCP-1 and MCP-2. After cascading down the pores of the microchannel plates, the electrons are accelerated to 5000 eV in the region between the MCP 54 and the phosphor anode in order to be mapped immediately onto the phosphor with a minimum of lateral drift and resolution loss. Since the photocathode 50 is kept in close proximity to the MCP 54 in order to maintain the desired resolution, such configuration is known in the image intensifier art as a proximity-focused channelplate intensifier (PFCIT). In a representative arrangement, the electrons emerging from the MCP 54 leave approximately 3 kV in the Al reflective layer 58 overlaying the phosphor layer 60, and therefore deposit roughly 2 kV in the phosphor layer (which may be properly referred to as a phosphor screen). Thus, the effective phosphor conversion $\epsilon_p$ is (2 kV)×(0.062 photons/electron/eV)=124 photons/electron. The fiberoptic substrate (or fiberoptic window, as it may be called because it provides a "view" of the phosphor screen) has a typical numerical aperture of ±45°, resulting in an effective coupling of a Lambertian emitting phosphor to the fiberoptic faceplate of approximately 50%, making $\epsilon_f = 0.5$. Thus, the overall image intensifier's photon gain, $G_p$, is $$G_p = \eta_{pc} \epsilon_p \epsilon_f G_e,$$

where $G_e$ is electron gain of the MCP. Assuming a photocathode quantum efficiency, $\eta_{pc}$, of 0.19, then $$G_p = 11.8 G_e.$$

Figure 5:
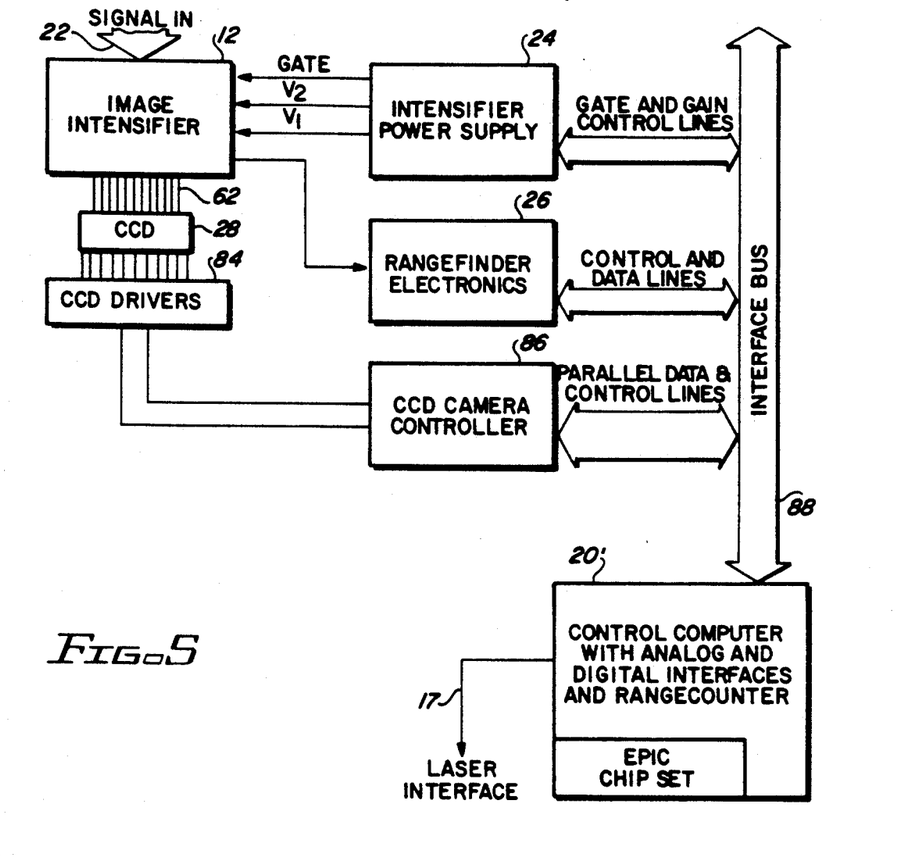
FIG. 5 shows a block diagram of the electronic circuits of a LIDAR receiver made in accordance with the present invention.

Referring next to FIG. 5, a block diagram of one embodiment of the electronic circuits of a unified LIDAR imaging and ranging system made in accordance with the present invention is illustrated. The embodiment shown in FIG. 5, as well as in FIGS. 6A and 6B below, is intended for an airborne or space application, where the mass, volume, and power requirements of the LIDAR system must to be kept as low as possible. Many of the components shown in FIG. 5 are the same as have been previously described in connection with FIGS. 1 or 2, and corresponding reference numerals are used to identify such components.

The power supply 24 provides the requisite bias voltages to the image intensifier 12. The supply 24 gates the photocathode with a minimum width of 100 nanoseconds. The bias voltage $V_2$ is controlled so that it can be adjusted in real time. The power supply 24 is further integrated with the range circuitry 26, a CCD camera controller 86, and a control computer 20' over an interface bus 88. The computer 20' performs the same function as the control circuit 20 shown in FIG. 1. By integrating the power supply 24 with the range circuitry 26 and the CCD camera controller 86, the bias voltage can be adjusted in real time as required in order to optimize the image and range signals. As required, the power supply 24 may comprise a power supply system made up of a plurality of separate power supplies. For example, one supply may provide the bias voltage $V_1$, another the bias voltage $V_2$, and yet another the bias voltage used by the MCP. Typically, only the bias voltage $V_2$, the one that provides the bias voltage to the photocathode, need to a gated voltage supply.

The CCD 28 is, for the embodiment shown in FIG. 5, a 128×128 pixel device. A larger device, such as the Thomson TH7895A, a 512×512 device, could also be used. Advantageously, the CCD can be "binned" so as to produce whatever pixel size is desired. The output for the CCD 28 is coupled through CCD drivers 84 to the CCD camera controller 86. In general, the CCD drivers will convert the analog signals available at each pixel to a digital signal using a suitable analog-to-digital converter (ADC). A preferred ADC is a twelve bit device, which when used enhances the dynamic range of the CCD camera. A suitable ADC is the AD671 available from Analog Devices of Norwood, Mass. The AD671 advantageously offers a 2×10⁶ sample conversion speed with 500 mW of power consumption, packaged in a 24 pin dual-inline package (DIP). Hence, the requirements for low volume, mass and power consumption are not compromised. Assuming a 128×128 pixel CCD, the total conversion time is 8.2 msec., thus making a 60 Hz frame readily achievable.

The control computer 20' for the embodiment shown in FIG. 5, is an 8 bit, 8080 type microprocessor. Included with the microprocessor are suitable controllers that contain digital-to-analog converters (DAC's) for analog control, buffered outputs for digital triggers and data I/O, an application specific integrated circuit (ASIC) for range counting, and a communications chip set for communication purposes. It is noted that a suitable ASIC, configured to perform the necessary range counting and interface, is commercially available from Simrad Optotronics, sold in the United Sates by Kigre Corp. of Hilton Head, N.C. A suitable communications chip set is commercially available from numerous sources, such as ACTEL or EPIC.

Figure 6A:
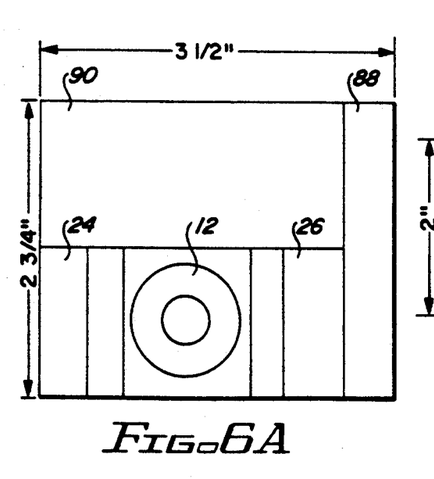
FIGS. 6A and 6B illustrate front and top views, respectively, of a preferred hardware layout of one embodiment of a LIDAR receiver and system made in accordance with the invention.
Figure 6B:
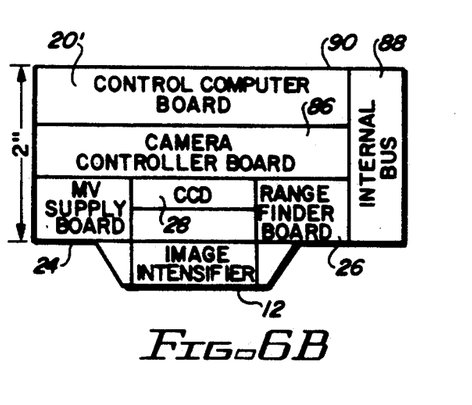

An integrated imaging and ranging LIDAR system as described above in FIG. 5 may be housed in a compact housing 90 as shown in FIGS. 6A and 6B. FIG. 6A shows a front view, and FIG. 6B shows a top view of the housing. 90. The same reference numerals as are used in FIG. 5 for the various components of the system are also used in FIGS. 6A and 6B. Advantageously, the arrangement of the components within the housing 90 provides an extremely compact size, having a width W of about 3½ inches (8.9 cm), a height of about 2¾ inches (7 cm), and a depth of about 2 inches (5.1 cm). The LIDAR receiver (image intensifier) 12 and CCD 28 are mounted together and placed toward the edge of the unit. The boards for each particular function are stacked around the intensifier and CCD. The dimensions shown may be changed within a reasonable aspect ratio in order to accommodate any particular mounting arrangement. The power dissipation, mass, surface area, and volume of each board (assuming a two-sided PC board) are shown in Table 1.

TABLE 1

| Component | Board Area (in²) | Board Volume (in³) | Power Consum (W) | Mass (g) |
|---|---|---|---|---|
| System Cntrl 20' | 8 | 4 | 3.5 | 60 |
| Rangefinder 26 | 4 | 2 | 1.7 | 40 |
| CCD Camera 28 | 8 | 4 | 5.5 | 70 |
| Rcvr 12 & PS 24 | 2 | 2 | 0.5 | 75 |
| Interconnections | | 3 | | 20 |
| TOTAL | 22 | 15 | 11.3 | 265 |

It is noted that the total board volume shown in Table 1 is a few cubic inches less than the total housing volume shown in FIGS. 6A and 6B. This is because of some dead space which necessarily results when the components are placed in the housing 90.

Figure 7:
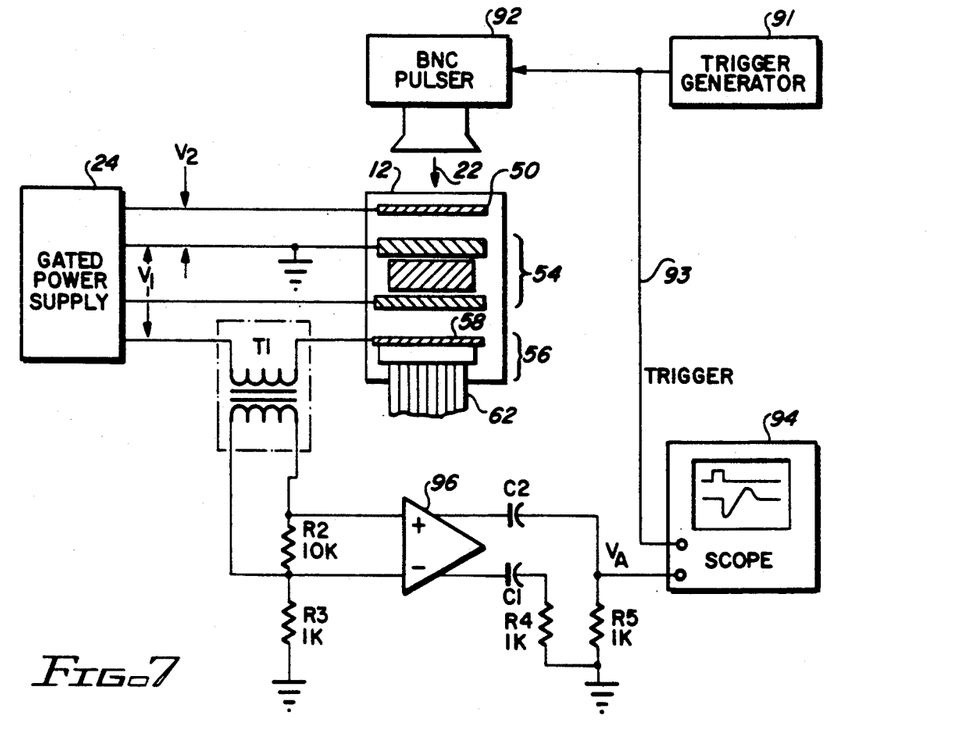
FIG. 7 is a block diagram that illustrates a particular test configuration that has been used to successfully demonstrate the present invention.
Figure 8:
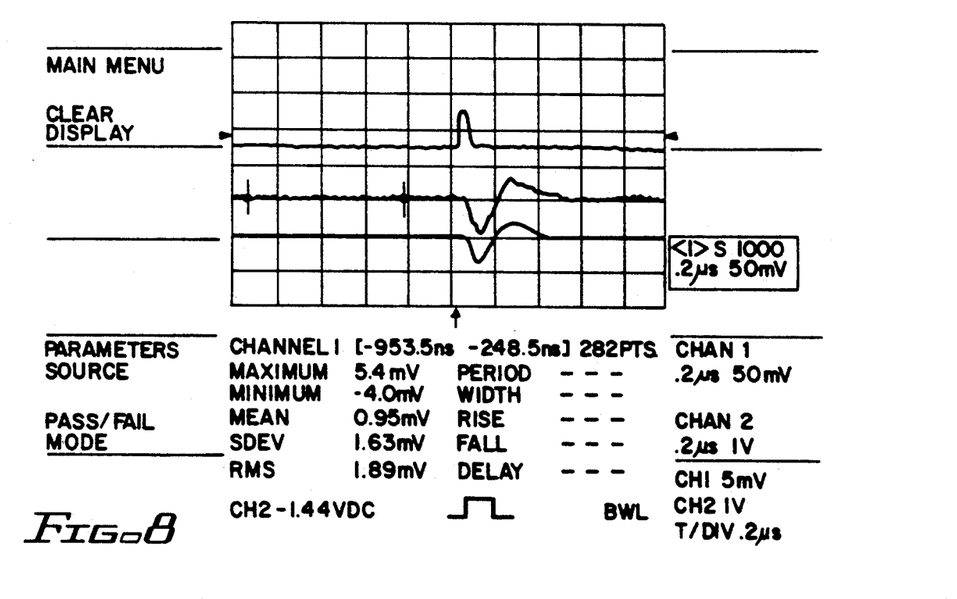
FIG. 8 is a waveform timing diagram that illustrates the operation of the test configuration shown in FIG. 7.

Referring next to FIGS. 7 and 8, there is shown a block diagram of a test configuration used to prove the operability of the present invention (FIG. 7), and a timing waveform diagram (FIG. 8) depicting the types of signals obtained using the test configuration of FIG. 7. As seen in FIG. 7, the LIDAR receiver 12, as previously described, is positioned to receive an optical input pulse 22 from a suitable pulsed light source 92. The light pulser 92 is set to generate approximately 700 photons per pulse when a trigger signal 93 is received. The trigger signal 93 is generated by a suitable trigger generator 91, which may be any suitable pulse generator. A high frequency oscilloscope 94, or equivalent device, is used to monitor the trigger signal and output signal from the LIDAR receiver 12. The oscilloscope 94 may be a model 9450 manufactured by LeCroy.

A suitable gated power supply 24 provides the desired operating voltages for the LIDAR receiver 12. One side or end of the MCP electron multiplier 54 is grounded. As shown in FIG. 7, the input side of the MCP is grounded, but this is only exemplary. The other side of the MCP is biased with an appropriate voltage needed for the operation of the MCP. The cathode 50 is biased with a voltage $V_2$ that is negative with respect to ground when the LIDAR receiver 12 is to be operational, i.e., when the LIDAR receiver is to be gated ON. When the LIDAR receiver 12 is to be gated OFF, the voltage $V_2$ may be switched positive relative to ground, or simply connected to ground so that there is no voltage potential between the cathode 50 and the MCP 54. The anode 56 is biased with a voltage $V_1$ that is positive with respect to ground when the LIDAR receiver is gated ON. The magnitude of the voltage $V_1$ and $V_2$ may be as previously described, e.g., $V_1$ may be on the order to 5–6 kV; and $V_2$ may be on the order of negative 200–300 V for some types of photocathodes, and up to negative 600–800 V for other types of photocathodes, e.g., GaAs-based photocathodes.

Those skilled in the art will readily recognize that the gated power supply 24 may actually comprise a stack of individual supplies, one to bias the cathode, one to bias the anode, and one to bias or power the MCP. For purposes of the test configuration shown in FIG. 7, such power supplies may be commercially available power supplies, such as the PS20015700 power supplies available from GBS Micro Power Supplies. Alternatively, those of skill in the art can readily design and fashion an appropriate power supply or supplies to provide the requisite bias voltages. Typically, only the power supply used to bias the cathode need be gated ON and OFF in order to gate the LIDAR receiver 12 ON and OFF. However, it may be desirable for some applications, in order to conserve power and/or to set appropriate initial conditions, to also gate one or more of the other power supplies ON and OFF.

As has been previously described, the anode 56 (and more particularly the metalized layer 58 overlying the anode 56) is coupled to the power supply 24 through a primary winding of the transformer T1. A secondary winding of the transformer T1 is connected to the positive and negative inputs of an appropriate high frequency differential amplifier 96, such as an LM733 C amplifier made by National Semiconductor. The transformer T1 may be as previously described. In order to appropriately bias the input of the amplifier 96, and to set an appropriate bandwidth, a resistor R2 is connected across the secondary winding of the transformer T1, and a resistor R3 is connected from one of the inputs of the amplifier 96 to ground. The differential output of the amplifier 96 is coupled through appropriate coupling capacitors C1 and C2 to a suitable resistive load, R4 and R5. The output voltage developed across the load R5, for purposes of the test being conducted, is considered as the anode voltage $V_A$, and is connected as an input signal to one channel of the oscilloscope 94. The other channel of the oscilloscope 94 is connected to display the trigger signal 93 generated by the trigger generator 91.

The transformer T1 shown in the test configuration of FIG. 7 has approximately 8 turns of No. 24 wire having an insulation capable of withstanding voltages up to $10^4$ volts. The secondary winding has approximately 100 turns of No. 36 wire, insulated to withstand a nominal pulse transformer voltage, e.g., 10–50 volts. The amplifier 96 shown in FIG. 7 is an LM733C (available from National Semiconductor), set for a gain of 10 and configured (via resistor/capacitor networks C1 and R4, and C2 and R5) to pass signals having a frequency of greater than about 800 Hz.

FIG. 8 shows exemplary waveforms as displayed on the screen of the oscilloscope 94 using the test configuration shown in FIG. 7. The top waveform is a pulse representing the optical pulse. The pulser 92, as indicated above, is set to generate optical pulses having a width of about 40 nanoseconds, with about 700 photons per pulse. The top waveform pulse is used as the trigger signal for the other pulses shown in FIG. 8. The middle waveform represents the a single anode voltage pulse, $V_A$, developed in response to a single optical pulse (top waveform), while the lower waveform represents an average of 1000 single shots of the anode voltage pulse, $V_A$. As seen in FIG. 8, the voltage pulse $V_A$ is, for the configuration shown, a negative pulse that has a very steep rise time, on the order of 20–30 ns or less, and a slower fall time. The steep rise time makes such pulse ideal for ranging purposes, as the leading edge of such pulse may be used to precisely stop the timer 70 (FIG. 2) of a suitable LIDAR system.

As described above, it is thus seen that the present invention provides a LIDAR system or method that provides ranging and imaging information using a single detection element. Advantageously, such single detection element employs only a single optical path, thereby minimizing the mass, size and power requirements of the system.

As further described above, it is seen that the invention provides a unified LIDAR system that generates both imaging and ranging output signals from the receipt of a single optical return pulse. This is made possible by a compact design that incorporates an image intensifier, having a photocathode, multichannel plate electron magnifier, and phosphor anode screen overlying an optical fiber window, with a metalized layer overlying the phosphor anode screen. The metalized layer advantageously provides a means for readily detecting a prompt anode current, which prompt anode current is generated simultaneously with the return of the optical return pulse. Further, transformer coupling allows the prompt anode current to be easily detected without the necessity of grounding the anode.

Additionally, it is seen that the invention provides a unified LIDAR receiver that provides significantly improved sensitivity with respect to both imaging and ranging functions compared to the sensitivity of LIDAR receivers of the prior art. One of the factors that makes such improved sensitivity possible is the avoidance of the use an avalanche photodiode detector.

While the invention herein disclosed has been described by means of specific embodiments and applications thereof, numerous modifications and variations could be made thereto by those skilled in the art without departing from the scope of the invention set forth in the claims.

What is claimed is:

1. An integrated LIDAR receiver comprising:

an image intensifier having an opaque cathode; an anode spaced apart from the cathode; a microchannel plate (MCP) electron multiplier positioned intermediate the cathode and anode; and a phosphor film deposited on a fiber optic substrate on said anode, said phosphor film being coated with a metalized layer;

a transformer having a primary winding and secondary winding;

power supply means for selectively applying a first voltage potential between said MCP and said anode through the primary winding of said transformer, with said anode being maintained at a positive potential relative to said MCP electron multiplier, and for selectively applying a second voltage potential between said MCP electron multiplier and said cathode, with said cathode being maintained at a negative potential relative to said MCP; and detection means coupled to the secondary winding of said transformer for detecting pulses of electrical current occurring at said metalized layer;

said pulses of electrical current occurring as a result of optical pulses striking said cathode, said optical pulses striking said cathode causing the emission of electrons, which electrons are multiplied by said MCP electron multiplier and accelerated towards said anode, with a fraction of the electrons striking said anode passing through said metalized film into the phosphor film, causing photons to be emitted in proportion to the energy of the electrons, said photons passing through said fiber optic substrate, and with a remaining fraction of the electrons striking said anode serving as a prompt electrical current pulse within said metalized layer, which prompt electrical current pulse induces a corresponding electrical current pulse in the secondary winding of said transformer, which corresponding electrical current pulse signals a precise time when the optical pulses strike said cathode.

2. The integrated LIDAR receiver as set forth in claim 1 wherein the first voltage potential is selected so that the metalized layer absorbs a prescribed amount of the energy of an electron beam that strikes said anode, with the balance of the energy of said electron beam being transferred to said phosphor film and being converted to photons, the energy of said electron beam being determined by the magnitude of the first voltage potential applied between said MCP electron multiplier and said anode, said first voltage potential being selected so that the metalized layer absorbs between approximately 2–5 KeV of energy.

3. The integrated LIDAR receiver as set forth in claim 2 further including an imaging sensor optically coupled to said fiber optic substrate, whereby photons passing through said fiber optic substrate may be sensed by said imaging sensor and converted to appropriate imaging signals representative of an optical signal, thereby providing imaging information.

4. The integrated LIDAR receiver as set forth in claim 2 further including electronic timer means for timing a time interval between a trigger signal and the occurrence of said prompt electrical current pulse, said time interval providing range information relative to a target whenever said trigger signal occurs coincident with the generation and transmission of an optical pulse towards the target, with said prompt electrical current pulse signaling the receipt of optical pulses reflected from said target.

5. The integrated LIDAR receiver as set forth in claim 1 wherein said power supply means selectively generates a third voltage potential to replace said second voltage potential, said third voltage potential having a polarity opposite that of said second voltage potential, said third voltage potential causing said image intensifier to be gated OFF when applied between said cathode and MCP electron multiplier.

6. The integrated LIDAR receiver as set forth in claim 1 wherein the cathode of said image intensifier comprises a photocathode that includes GaAs, and wherein said second voltage potential generated by said power supply means applies a voltage to said photocathode that is 600–800 volts more negative than said MCP.

7. The integrated LIDAR receiver as set forth in claim 6 wherein the quantum efficiency (QE) provided by said photocathode is at least 40%.

8. A LIDAR system for providing ranging and imaging information relative to a target, said LIDAR system including:

(1) means for generating and directing a pulse of radiant energy having a known wavelength towards said target in response to a trigger signal;

(2) a integrated LIDAR receiver for receiving radiant energy of said known wavelength reflected from said target, said integrated LIDAR receiver comprising:
   (a) a cathode spaced apart from an anode, electrons being emitted by said cathode in response to said cathode being impinged by radiant energy reflected from said target;
   (b) electron multiplier means positioned intermediate the cathode and anode for receiving the electrons emitted from the cathode, and emitting a larger number of electrons than received, and
   (c) said anode comprising a first layer of a first selected material overlaying a fiber optic substrate, and a second layer of a second selected material overlaying said first layer; a fraction of the electrons striking said anode passing through said second layer and being converted to photons in said first layer, said photons thereafter being detectable through said fiber optic substrate; and a remaining fraction of the electrons striking said anode remaining in said second layer and being detectable as a prompt anode current;

(3) a transformer having a primary winding and a secondary winding;

(4) power supply means for selectively applying a first voltage potential between said MCP electron multiplier and said anode of said LIDAR receiver through said primary winding of said transformer, and for selectively applying a second voltage potential between said MCP and said cathode; said second voltage potential when of the proper polarity causing electrons emitted by said cathode to be accelerated towards said MCP electron multiplier, and said first voltage potential causing electrons emitted by said MCP electron multiplier to be accelerated towards said anode with a prescribed energy;

(5) detection means coupled to the secondary winding of said transformer for detecting the occurrence of said prompt anode current;

(6) timing means for measuring the elapsed time between said trigger signal and the detection of said prompt anode current;

(7) an image sensor coupled to said fiber optic substrate for generating an image signal responsive to photons impinging said image sensor through said fiber optic substrate; and (8) processing means for generating said trigger signal, processing said image signal, and computing a range indication from the elapsed time measured by said timing means, whereby both image and range information are provided relative to said target by detecting radiant energy of said known wavelength reflected from said target through said integrated LIDAR receiver.

9. The LIDAR system as set forth in claim 8 wherein said power supply means applies said first voltage potential between said anode and said electron multiplier means so as to maintain a prescribed side of said electron multiplier means at a substantially zero or ground potential.

10. The LIDAR system as set forth in claim 9 wherein said power supply means further includes means for selectively applying a third voltage potential in lieu of said second voltage potential between said electron multiplier means and said cathode, said third voltage potential being of an opposite polarity than said second voltage potential, said third voltage potential when applied causing said integrated LIDAR receiver to be biased off.

11. The LIDAR system as set forth in claim 8 wherein the first voltage potential is selected so that the second layer of said anode absorbs a portion of the energy of an electron that strikes said anode, with the balance of the energy being transferred to the first layer of said anode where it is converted to photons.

12. The LIDAR system as set forth in claim 11 wherein said first voltage potential is selected so that the second layer of said anode absorbs between approximately 2 to 5 KeV of electron energy.

13. The LIDAR system as set forth in claim 8 wherein said detection means comprises
   a first amplifier that converts an electrical current pulse induced in the secondary winding of said transformer to a voltage signal, and
   a second amplifier that compares the voltage signal generated by said first amplifier to a reference voltage level and generates an output signal only when said voltage signal pulse exceeds said reference voltage level.

14. The LIDAR system as set forth in claim 13 wherein said power supply means maintains one end of said electron multiplier means at a substantially zero potential.

15. The LIDAR system as set forth in claim 13 further including a power supply gate circuit that generates a gate signal for controlling said power supply means, said gate signal enabling said power supply means a prescribed time $T_E$ after the generation of said pulse of radiant energy, and disabling said power supply means a time $T_S$ after the leading edge of said return signal.

16. The LIDAR system as set forth in claim 15 wherein the time $T_S$ is 5-10 nanoseconds.

17. A method of determining both image and range information relative to a target using a single LIDAR detector, said LIDAR detector including a cathode spaced apart from an anode, with electrons being emitted by the cathode in response to the cathode being impinged by radiant energy reflected from said target; and with said anode including a phosphor layer covered with a metalized layer, said method comprising the steps of:

(a) generating a pulse of radiant energy having a known wavelength and directing said radiant energy pulse at said target;

(b) receiving radiant energy reflected from said target of said known wavelength at the cathode of said LIDAR receiver;

(c) biasing said anode relative to said cathode of said LIDAR receiver such that electrons emitted from said cathode in response to the radiant energy received in step (b) are accelerated towards said anode with a prescribed energy, said prescribed energy being selected such that a fraction of the electrons striking said anode pass through said metalized layer into said phosphor layer and cause photons to be emitted, and a remaining fraction of the electrons striking said anode remain in said metalized layer and are detectable as a prompt anode current;

(d) detecting the photons generated in said phosphor layer and producing an image signal therefrom;

(e) detecting the prompt anode current in said metalized layer;

(f) measuring the elapsed time between the generation of the radiant energy pulse in step (a) and the detection of the prompt anode current in step (e); and (g) calculating the distance to the target based upon the elapsed time measurement of step (f).

18. The method as set forth in claim 17 wherein step (c) includes biasing said anode through the primary winding of a transformer so as to be at a positive potential relative to said cathode.

19. The method as set forth in claim 18 wherein step (e) comprises detecting a current pulse induced in the secondary winding of said transformer.

20. The method as set forth in claim 19 further including multiplying the number of electrons emitted from said cathode of said LIDAR receiver prior to having said electrons strike said anode.

21. The method as set forth in claim 20 wherein the step of multiplying the number of electrons emitted from said cathode comprises inserting a multichannel plate (MCP) electron multiplier between said cathode and anode and maintaining one end of said MCP electron multiplier at a substantially ground potential.

22. The method as set forth in claim 21 further including biasing said cathode at a voltage that is at least 600 volts negative relative said MCP.

* * * * *